United States Patent [19]

Everett, Jr. et al.

[11] Patent Number: 5,309,140
[45] Date of Patent: May 3, 1994

[54] FEEDBACK SYSTEM FOR REMOTELY OPERATED VEHICLES

[75] Inventors: Hobart R. Everett, Jr.; Judy M. Nieusma, both of San Diego, Calif.

[73] Assignee: The United States of America as represented by the Secretary of the Navy, Washington, D.C.

[21] Appl. No.: 800,341

[22] Filed: Nov. 26, 1991

[51] Int. Cl.[5] ............................................. B60Q 1/00
[52] U.S. Cl. .................. 340/466; 340/407.1; 340/441
[58] Field of Search ............... 340/406, 407, 692, 460, 340/965, 825.19, 474, 438, 441; 324/160, 163; 73/488, 495, 514

[56] References Cited

U.S. PATENT DOCUMENTS

| | | | |
|---|---|---|---|
| 2,881,631 | 4/1959 | Riccius | 74/470 |
| 3,119,190 | 1/1964 | Cafulli et al. | 35/11 |
| 3,157,853 | 11/1964 | Hirsch | 340/965 |
| 3,479,750 | 11/1969 | Swanson | 35/11 |
| 3,748,749 | 7/1973 | Buscher et al. | 35/11 |
| 3,856,104 | 12/1974 | Ohba | 180/98 |
| 4,030,208 | 6/1977 | Carver et al. | 35/12 F |
| 4,244,120 | 1/1981 | Harris | 340/407 |
| 4,560,983 | 12/1985 | Williams | 340/407 |
| 4,876,527 | 10/1989 | Oka et al. | 340/441 |
| 4,952,152 | 8/1990 | Briggs et al. | 434/69 |
| 5,012,221 | 4/1991 | Neuhaus et al. | 340/474 |

Primary Examiner—Donnie L. Crosland
Attorney, Agent, or Firm—Harvey Fendelman; Thomas Glenn Keough; Michael A. Kagan

[57] ABSTRACT

The present invention is a system for providing an output corresponding to the speed of a remote vehicle, comprising: a speed transducer mounted on the vehicle for providing a first output corresponding to the speed of the vehicle; a first data processor operably coupled to receive the first output from the speed transducer means for providing an ASCII coded output; a second data processor operably coupled to receive the ASCII coded output from the first data processor for providing an output transducer control output; and an output transducer operably coupled to receive the control output from the second data processor for providing an output having an amplitude proportional to the speed of the vehicle.

12 Claims, 4 Drawing Sheets

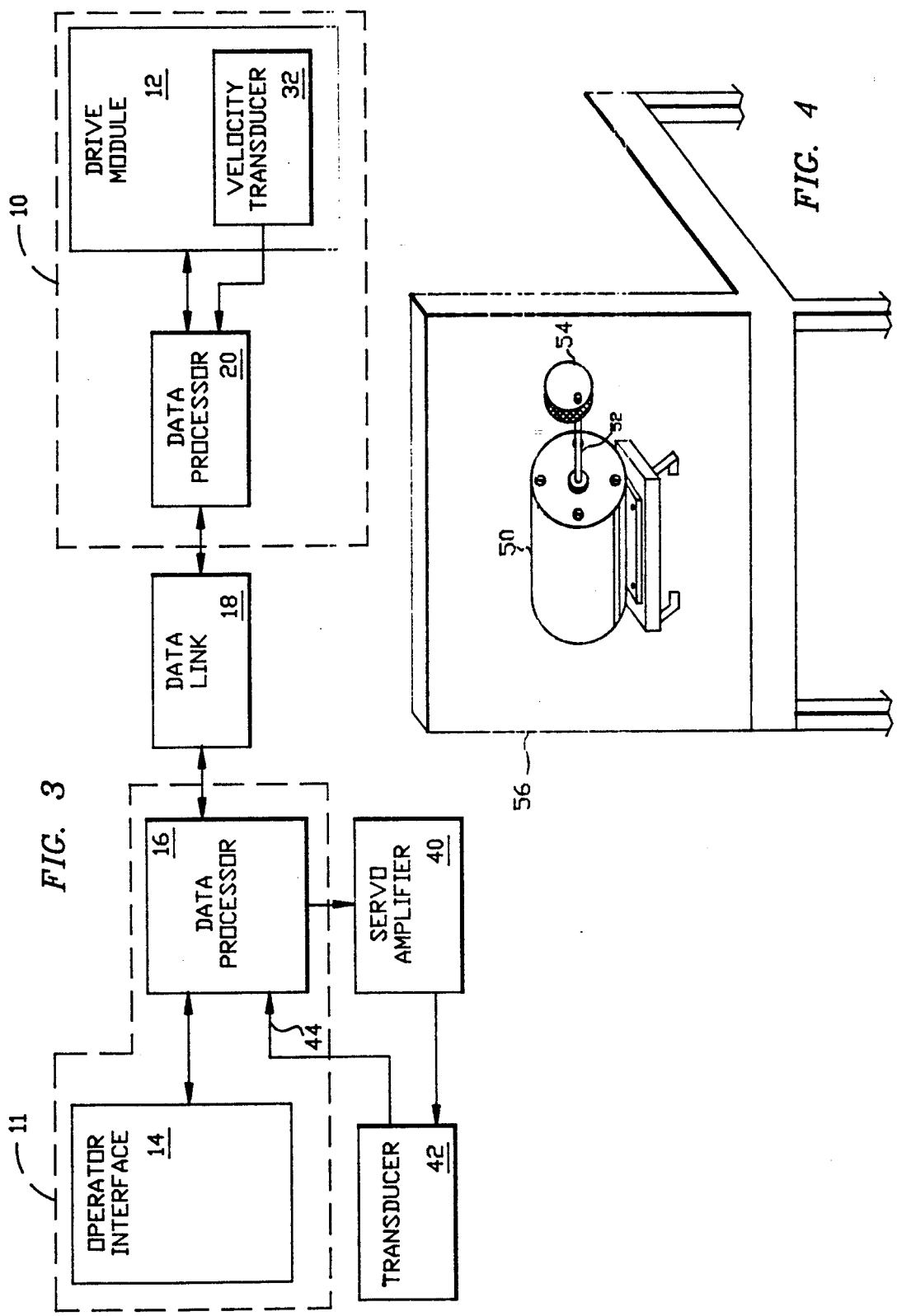

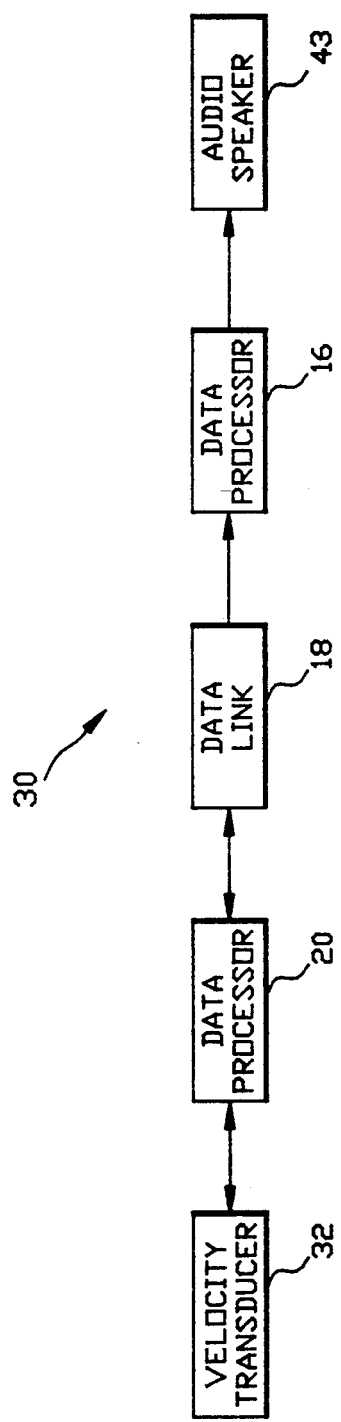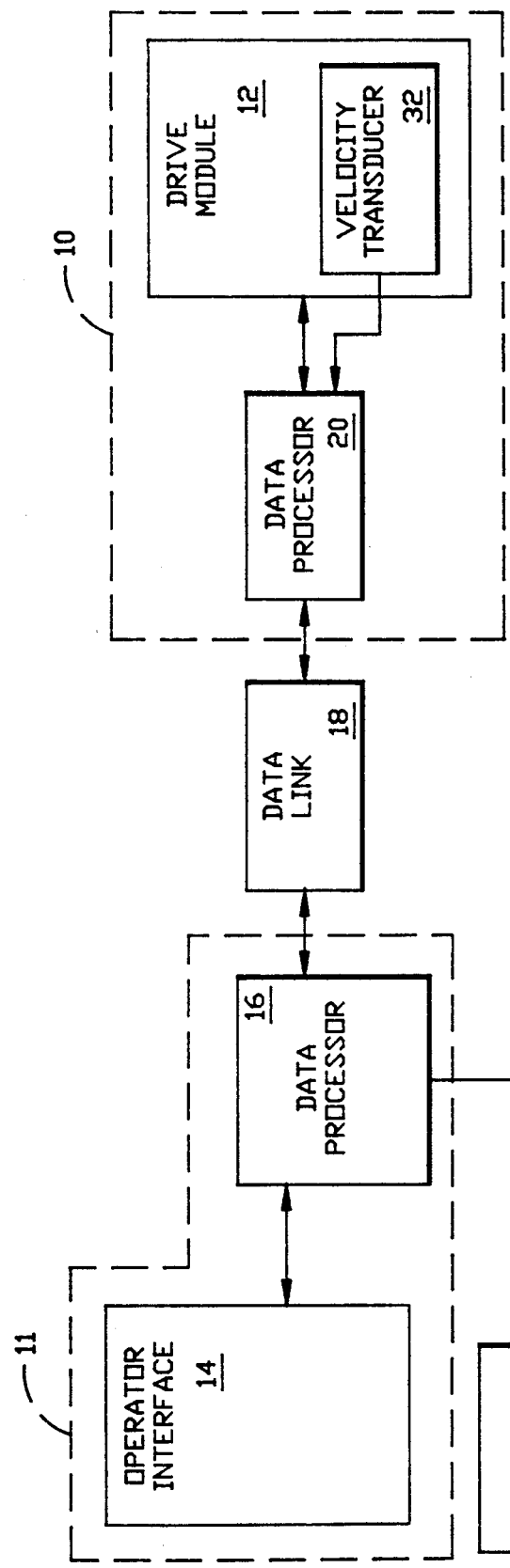

FEEDBACK SYSTEM FOR REMOTELY OPERATED VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a system by which a human operator of a remote unmanned vehicle is provided sensory inputs relating to the operating characteristics of the vehicle. More specifically, the present invention provides a system by which the human operator of an unmanned vehicle is able to sense the speed of the moving vehicle without having to read a visual indicator.

The use of remotely operated vehicles in applications such as material and inventory control in manufacturing environments is increasing and becoming ever more sophisticated. Recent advances in technology have brought about an even greater interest for their use in hazardous environments, such as nuclear power plants, underwater search and recovery, fire-fighting, and bomb disposal, to name a few. Often, however, the advantages afforded by removing the operator from a hazardous environment are significantly offset by the difficulties encountered in controlling the remote vehicle. This limits the types of practical applications of remotely controlled robots to those for which the perils associated with direct exposure justify the expense and complexity of the remote system.

A considerable amount of work has been done over the past decade to improve the man-machine interface for teleoperated (remotely controlled) systems in an attempt to achieve a higher operational equivalence ratio. The operational equivalence ratio may be defined as the amount of time it takes to perform a series of tasks, divided by the amount of time it would take an operator to perform the same tasks remotely.

Some recent applications involving remote control systems employ a concept of remote telepresence, which utilizes stereo vision as well as binaural hearing to give the operator a stronger sense of being in the working environment. Head-coupled displays have been employed to further enhance this perception. A pair of high-resolution cameras on a remotely controlled vehicle are positioned in real-time in accordance with the pan and tilt movements of a helmet worn by the operator at the control station. The helmet is equipped with miniature monitors to relay the video from the left and right cameras to the left and right eyes of the operator, thus providing some degree of depth perception.

As the operator turns his head toward elements of interest in the scene being viewed, the remote slave positions the cameras accordingly to achieve the desired input. The 3-D capability thus provided is a decided improvement over monocular vision. However, its negative side effects include extremely high operator fatigue, tendency to induce nausea in some operators, higher bandwidth requirements in the control loop and significantly enhanced system complexity. In most remote systems in use today, the operator's only sense of vehicle speed is derived from the visual display alone and this can lead to problems if the operator is distracted from looking at the display.

A block diagram of a typical commercially available remotely controlled unmanned vehicle, such as the TRC Labmate, or Cybermotion NavMaster, is illustrated in FIG. 1. In this type of system, a human operator controls unmanned vehicle system 10, comprised of different subsystems that include servo-controlled drive module 12, from an operator interface 14 which could be a computer work station 11 that typically includes one or more data input devices such as a keyboard or joystick, and a display such a video monitor, not shown. Control data provided by the operator is received by host computer 16 which transmits operating instructions to drive module 12 through a data link 18 which could be an RF link or a data bus. The operating instructions are received by a remote computer 20 mounted onboard remote vehicle 10. Remote computer 20 coordinates the different systems that may be onboard unmanned vehicle 10, including drive module 12. Data representing the operating characteristics of vehicle 10 is conveyed back to operator interface 14 through remote computer 20 via data link 18, to host computer 16 and is displayed by a video monitor which is part of operator interface 14.

A fundamental consideration in the design of a remotely operated system is the ability of the operator to control the vehicle based on system status feedback received from the vehicle. The primary source of feedback used by an operator when driving a typical remotely operated vehicle is a visual image received from a camera that surveys the vehicle's operating environment. The visual image of the operating environment displayed on the video monitor, however, cannot provide the same degree of depth perception or visual acuity that an operator seated in the vehicle would have, even with the more advanced stereo tele-presence systems. The performance of the vehicle is therefore degraded. Other types of useful feedback information, such as vehicle speed and heading, are typically overlaid on this same video monitor. However, safe operation of the vehicle in such a situation, where the operating characteristics of the vehicle are displayed on a video monitor, requires constant vigilance by the human operator in reading the data display presented on the video monitor. A disadvantage of this type of data presentation is that if the operator should become distracted or fatigued, the safe operation of the vehicle may be compromised.

For example, the operator may attempt to provide a halt instruction to the vehicle, but the instruction may not be faithfully executed for any variety of reasons, which could include the vehicle rolling down a hill in neutral, or a the failure of the vehicle brakes. The actual vehicle speed might be displayed on the video monitor, but the operator may not be expecting the need to pay attention to it. Another foreseeable circumstance in which the operator is not cognizant of the vehicle speed would be if the operator became distracted, or where it was assumed that the intended instruction was fulfilled without confirmation by reading the video display.

Therefore, there is a need for a feedback system which provides non-visual feedback of the actual vehicle speed so that the operator is not required to focus his attention on a dedicated vehicle speed display representation.

SUMMARY OF THE INVENTION

The present invention provides means for the human operator of an unmanned vehicle to sense the speed of the moving vehicle without having to read a visual indicator. Information from a movement sensor located on the vehicle is transmitted to servocontrolled DC electric motor having an eccentric weight attached to the output shaft of the motor. The motor assembly is mounted to the frame of the operator's seat, causing it to vibrate in proportion to the speed of the vehicle. Thus, the operator can "sense" the actual speed of the vehicle, without having to look at a video display of the vehicle's speed.

The novel feature of this invention is that it provides the operator with the means to "sense" the actual speed of a remote vehicle under the operator's control without the need of the operator to observe a digital or analog display of vehicle speed.

The present invention comprises: a speed transducer mounted on the vehicle for providing a first output corresponding to the speed of the vehicle; a first data processor operably coupled to receive the first output from the speed transducer means for providing a digital representation of the speed transducer output, such as an ASCII coded output; a second data processor operably coupled to receive the ASCII coded output from the first data processor for providing a transducer control output; and an output transducer operably coupled to receive the second output from the second data processor for providing a mechanical or acoustical output having an amplitude proportional to the speed of the vehicle.

An object of the invention is to provide a signal from an unmanned remote vehicle to a human operator which is proportional to the actual speed of the vehicle.

A further object of the invention is to provide a non-visual sensory input to a human operator that is functionally related to the actual speed of a remote vehicle.

These and other objects of the invention will become more readily apparent from the ensuing specification when taken in conjunction with the drawings and appended claims.

BRIEF DESCRIPTION OF THE DRAWINGS

FIG. 3 is a block diagram showing the present invention integrated with a prior art remotely controlled unmanned vehicle system.

FIG. 4 shows an example of the output transducer as an electric motor having an eccentric weight mounted to the motor shaft, and the electric motor mounted to the back of the chair in which the operator sits.

FIG. 7 is a block diagram of a third embodiment of the present invention.

FIG. 8 is a block diagram showing the third embodiment integrated with a prior art remotely controlled unmanned vehicle system.

DESCRIPTION OF THE PREFERRED EMBODIMENT

Figure 2:
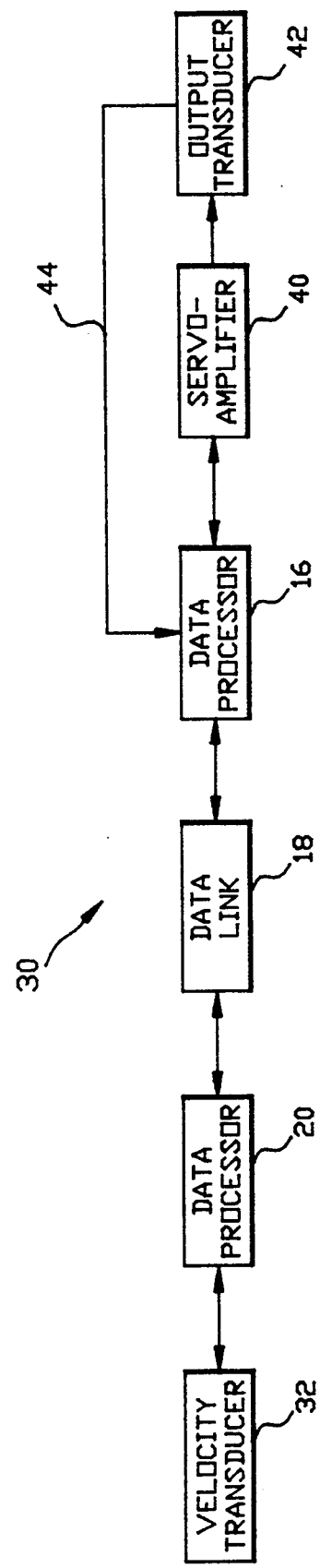
FIG. 2 is a block diagram of the present invention.

Referring now to the drawings, wherein like reference numerals designate like o similar parts throughout the several views, there is illustrated in FIG. 2 a block diagram of sensory feedback system 30 of the present invention suitable for use in conjunction with remotely operated vehicles. Velocity transducer 32 is mounted to a remotely controlled vehicle in accordance with well known techniques so as to generate an output corresponding to the speed of the vehicle. Velocity transducer 32 may be a tachometer-generator or preferably, an optical shaft encoder with a phase-quadrature outputs. The output of transducer 32 is received by data processor 20 which transforms it into a digitally encoded representation, as for example, in ASCII code, of the output of transducer 32. The ASCII coded output is conveyed by data link 18 to data processor 16 which uses it to access addresses in a look-up table that each store a value representing a speed of the vehicle. Servo-amplifier 40 receives the value output by data processor 16 and outputs a signal to output transducer 42 which is thus proportional to the speed of the vehicle. Data link 18 may be a hard wire data bus, fiber optic, near-infrared control link, or an RF transmitter/receiver combination.

Referring to FIG. 4, output transducer 42 provides an output which is in the form of a vibration which is capable of being perceived by a human being, as for example, the vibration produced by a buzzer or loudspeaker. Another example of output transducer 42 is a motor 50 having an output shaft 52 on which is mounted an eccentric weight 54. In the preferred embodiment, motor 50 is a DC electric motor. Motor 50 is mounted to operator control platform 56 on which the human operator is supported. Platform 56 may, for example, be a deck structure on which the operator stands, or it may be a chair in which the operator sits. Platform 56 may also even be a combination of both a deck structure and a chair. The rotational speed of shaft 52, and hence, eccentric weight 54, is proportional to the speed of the vehicle. Thus, by this arrangement, as the speed of the vehicle increases the vibrational force transmitted by rotating eccentric weight 54 through platform 56 increases. This vibrational force is perceived by the human operator if the operator is in contact with platform 56. Conversely, as the speed of the vehicle diminishes, the rotational speed of eccentric weight 54 decreases. This causes the vibrational force to have a diminished intensity. The operator thus perceives a vibration, which provides the benefit of a non-visual sensory input qualitatively related to the speed of the remote unmanned vehicle.

Figure 1:
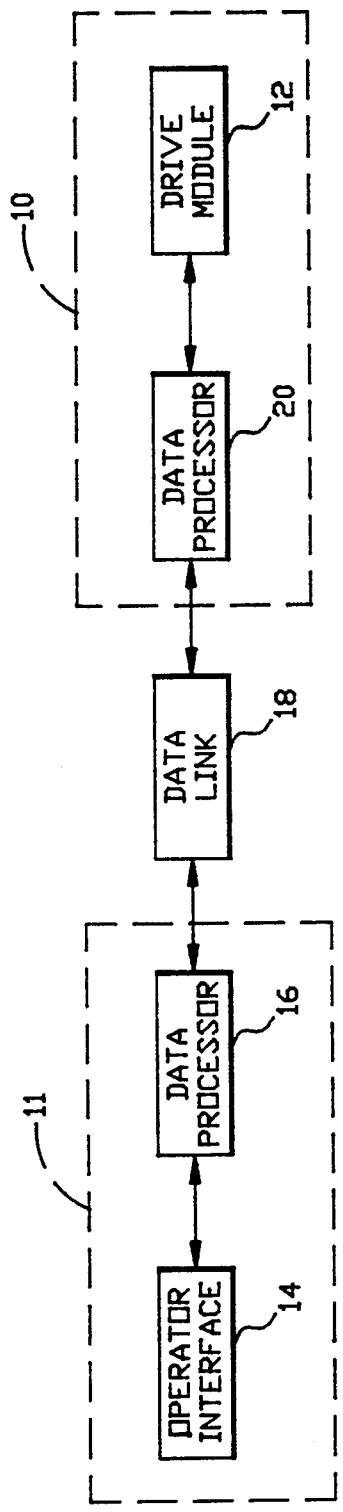
FIG. 1 is a block diagram of a prior art remotely controlled unmanned vehicle system that is operated by a remote interface and host computer.

Referring to FIG. 3, the present invention 30 may be integrated with the prior art system represented in FIG. 1 such that velocity transducer 32 detects the speed of drive module 12 in accordance with techniques well known by those skilled in this technology. For example, one way of detecting speed is to couple the rotary shaft of a tachometer-generator or optical rotary shaft encoder with a shaft on drive module 12 which rotates at a speed proportional to the speed of the vehicle. The output of output transducer 42 of the present invention is provided as an input to the operator interface 14, as for example, a vibration induced in operator chair 56.

Figure 5:
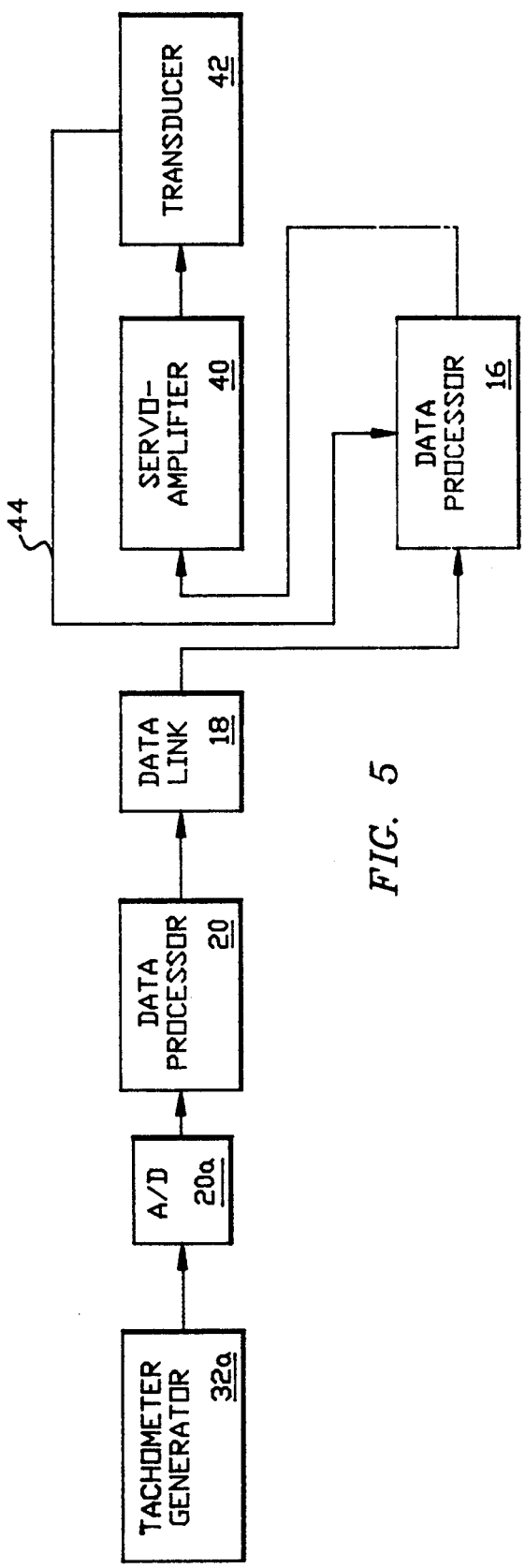
FIG. 5 is a block diagram of one example of the present invention.

In another example of the present invention, as illustrated in FIG. 5, velocity transducer 32 is a tachometer-generator 32a outputting an analog voltage signal proportional to the tachometer speed. The analog signal is converted to a digital signal by A/D converter 20a. The digital signal is provided to data processor 20 which transforms the digital data into ASCII coded output using techniques well known by those skilled in this field of technology. The ASCII coded output represents values linearly related to the tachometer speed, and hence, the actual speed of the vehicle. The output of data processor 18 is provided as an input to data link 18 which conveys the data to data processor 16. The output of data processor 16 received by servo-amplifier 40 and output transducer 42 as previously described above.

Figure 6:
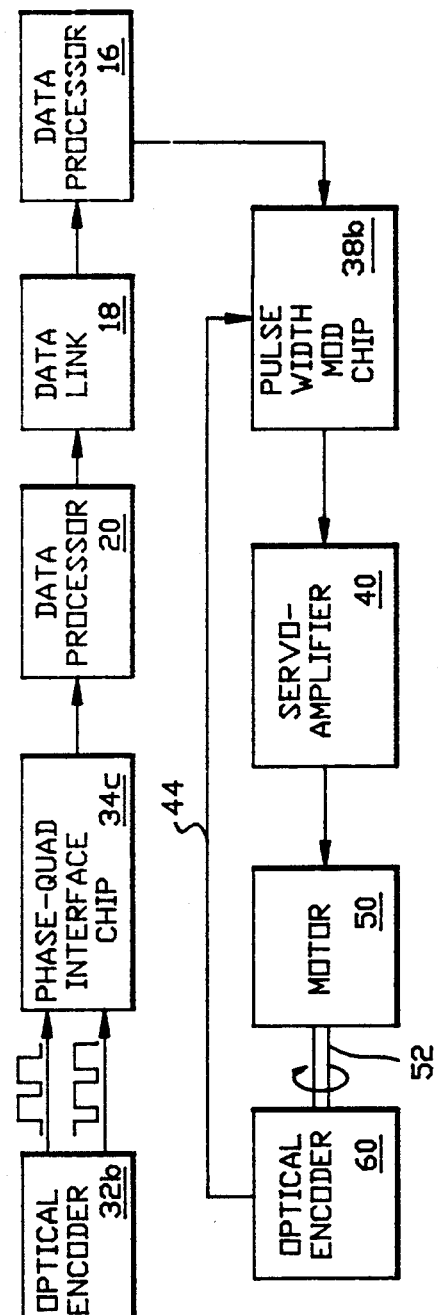
FIG. 6 is a block diagram of another example of the present invention.

Another embodiment of the present invention is described with reference to FIG. 6 and described as follows: Optical shaft encoder 32b which serves a speed transducer 32 (FIG. 2) provides a phase-quadrature output to a phase-quadrature interface chip 34c, which by way of example, may be a Hewlett Packard HCTL-1100. Data processor 20 receives the digital output from chip 34c and transforms it into an ASCII output that is conveyed as a digital data stream via data link 18 to data processor 16. The digital output of data processor 16 is provided to pulse width modulation chip 38b which establishes the pulse width modulation cycle of the output of servo-amplifier 40, which ultimately determines the speed of rotation of motor 50. The output of chip 38b controls servo-amplifier 40 which in turn provides a related DC output that directly controls the speed of motor 50. In the preferred embodiment, rotary optical shaft encoder 60 is mounted to output shaft 52 of motor 50 so as to provide velocity feedback 44 to chip 38b. Feedback 44 enables chip 38b to more closely regulate the speed of motor 50 under potentially varying conditions such as motor bearing friction, temperature, supply voltage, etc. It is to be understood however, that the present invention may be practiced without feedback 44 should it not be required.

Another embodiment of the present invention is described with reference to FIG. 7 where data processor 16 provides an output so as to drive audio speaker 43 at a frequency and/or amplitude proportional to the speed of the vehicle. Commercially available data processors having these functions are well known by those skilled in this field of technology. In accordance with the above teachings, this embodiment may be implemented where velocity transducer 32 is a tachometer such as tachometer generator 32a, or as an optical encoder such as optical encoder 32b. FIG. 8 illustrates an example of how this embodiment may be integrated into remotely controlled unmanned vehicle system 10. This embodiment obviates the necessity for the human operator to remain at a restricted location, such as a chair, and the need to continuously observe a video monitor in order to be aware of the actual speed of the vehicle.

The present invention provides an additional dimension to the control of a remotely operated vehicle. In addition to the standard visual and audio feedback systems, this system provides an input to the operator's tactile sense for feeling movement. Vibration feedback is a more natural means of sensing motion than visual feedback. A change in the vibration feedback serves to alert the operator to unexpected vehicular motions. Providing an input to the operator's senses of touch and/or hearing increases the operator's sense of "telepresence".

Obviously, many modifications and variations of the present invention are possible in light of the above teachings. For example, the scope of the invention includes using the output of processor 38 to drive output transducers besides those specifically described above. Types of transducers which may also be effectively employed in the implementation of the present invention may include flashing lamps, and audio alerts as would be well known by those skilled in this field of technology. It is therefore to be understood that within the scope of the appended claims, the invention may be practiced otherwise than as specifically described.

We claim:

1. A system for providing an output corresponding to the speed of a remote vehicle, comprising:
   speed transducer means mounted on the vehicle for providing a first output corresponding to the speed of the vehicle;
   first data processor means operably coupled to receive said first output from said speed transducer means for providing a digitally encoded second output representing the first output;
   second data processor means operably coupled to receive said second output from said first data processor means for providing a transducer control output; and
   output transducer means operably coupled to receive said transducer control output from said second data processor for providing a transducer output having an amplitude proportional to the speed of the vehicle.

2. The system of claim 1 further including:
   an operator support platform; and where said transducer output is a vibration imparted to said operator support platform.

3. The system of claim 2 wherein:
   said speed transducer means is an optical rotary shaft encoder having a phase-quadrature output.

4. The system of claim 3 further including:
   a radio data link for conveying said digitally encoded second output from said first data processor to said second data processor.

5. The system of claim 2 wherein:
   said speed transducer is a tachometer-generator.

6. The system of claim 5 further including:
   a radio data link for conveying said digitally encoded second output from said first data processor to said second data processor.

7. A system for providing an output corresponding to the speed of a remote vehicle, comprising:
   speed transducer means mounted on the vehicle for providing a first output corresponding to the speed of the vehicle;
   first data processor means operably coupled to receive said first output from said speed transducer means for providing a digitally encoded second output representing said first output;
   second data processor means operably coupled to receive said digitally encoded second output from said first data processor means for providing a transducer control output; and
   output transducer means operably coupled to receive said transducer control output from said second data processor for providing an acoustic output having a frequency proportional to the speed of the vehicle.

8. The system of claim 7 further including:
   an operator support platform; and where second digitally encoded output is an ASCII coded output.

9. The system of claim 8 wherein:
said speed transducer means is an optical rotary shaft encoder providing phase-quadrature outputs.

10. The system of claim 9 further including:
a radio data link for conveying said ASCII coded output from said first data processor to said second data processor.

11. The system of claim 8 wherein:
said speed transducer is a tachometer-generator.

12. The system of claim 11 further including:
a radio data link for conveying said ASCII coded output from said first data processor to said second data processor.

* * * * *